J. P. REEL & A. J. SEYLER.

MIDDLINGS-SEPARATOR.

No. 7,526. Reissued Feb. 20, 1877.

Attest
W. T. Baker
Ullman Strong.

Inventor
Joseph P. Reel
Andrew J. Seyler
By F. E. Wilmer
Attorney.

N. PETERS, PHOTO-LITHOGRAPHER, WASHINGTON, D. C.

UNITED STATES PATENT OFFICE.

JOSEPH P. REEL AND ANDREW J. SEYLER, OF CEDARVILLE, ILLINOIS.

IMPROVEMENT IN MIDDLINGS-SEPARATORS.

Specification forming part of Letters Patent No. 176,242, dated April 18, 1876; reissue No. 7,526, dated February 20, 1877; application filed November 13, 1876.

*To all whom it may concern:*

Be it known that we, JOSEPH P. REEL and ANDREW J. SEYLER, of Cedarville, in the county of Stephenson and State of Illinois, have invented a new and Improved Middlings-Purifier, of which the following is a specification:

The invention comprises a reel in which the fine middlings are first separated from the light coarse matters to be discharged, and air-blast apparatus and sieves for separating the remaining middlings from the residue passing out of the tail of the reel, all as hereinafter described.

Figure 2:
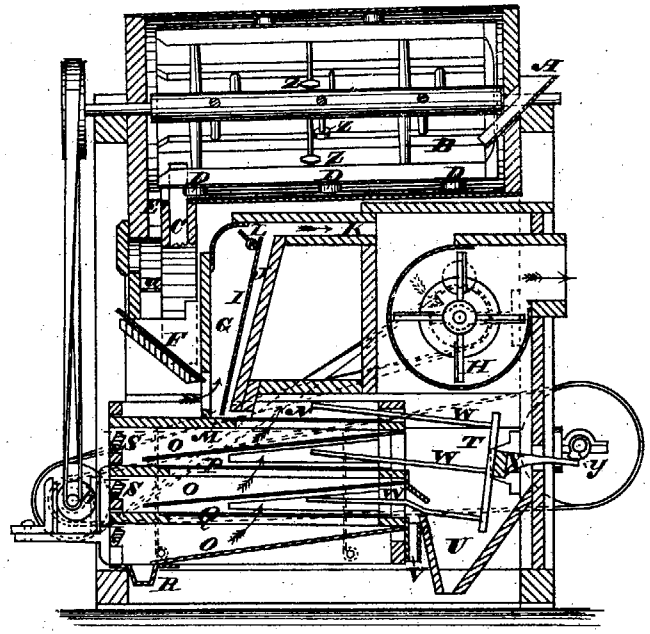
Figure 1:
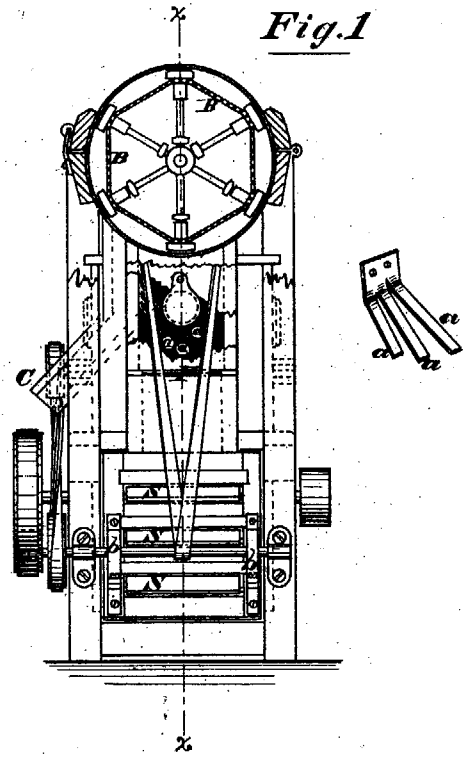

Figure 1 is a longitudinal sectional elevation of our improved machine, showing the distributing device; and Fig. 2 is a transverse section.

Similar letters of reference indicate corresponding parts.

A is the spout through which the middlings are fed into the reel B, which makes the first separation, and delivers the fine middlings to the spout C by spiral conveyer vanes or flights D on the outside, while the residue is discharged into passage E, where it is spread out into downwardly-inclined chutes *a*, which project at different degrees of inclination from one side of the passage E, partly across it, and serve to scatter the falling middlings, that rebound from them in their descent into a wide stream, which falls on the chute F, by which it is delivered into a spout, G, in which the light particles are taken up by the draft of the fan H over the partition, where the heaver particles fall back through spout J, while the light matters are carried off through spout K. The valve L at the top of the spout G regulates the quantity and character of the portion falling back through spout J. The middlings from spouts G and J fall on the feed-board M, and are delivered by it to sieve N, through which they fall upon the return-chute O, which carries them back to the head of sieve P, and so on through sieve Q to the bottom chute O, by which they are discharged to the spout R, being subject all the time they are on the sieves to air-blasts, regulated by valves S, and taking off the light matters into space T, from which those matters escaping from above the sieves N and P fall into the hopper U, and the rest from sieve Q fall into spout V, making different grades. W represents beaters, combined with the sieves, to prevent them from clogging. They are attached to the shaft X, and operated by a cam-shaft, Y, at the head of the machine. The reel has rings Z fitted on some of the arms, to slide forward and backward between the shaft and nibs for knocking the cloth clear. The sieves N P Q are arranged in a shaker, which is operated by an eccentric, *b*.

Having thus described our invention, we claim as new and desire to secure by Letters Patent—

1. The spreaders *a*, arranged in passage E, above the chute F, projecting from one side thereof, partly across it, and inclined at different angles, as and for the purpose described.

2. The combination, in a middlings-separator of the passage E, separator *a*, chute F, and spout G, arranged substantially as described with relation to each other, for the purposes set forth.

3. The spouts G and J, terminating at the top in the eduction-flue K, in combination with the feed board or floor M, and the valve L at the top of spout G, substantially as and for the purposes specified.

4. The series of knockers W, rigidly attached to a common vibratory shaft, X, as and for the purposes specified.

JOSEPH P. REEL.
ANDREW J. SEYLER.

Witnesses:
J. W. HENNEY,
J. W. MCCLENAN.